(12) United States Patent
Divry (10) Patent No.: US 11,130,377 B2
(45) Date of Patent: Sep. 28, 2021

(54) AMPHIBIOUS VEHICLE PROVIDED WITH A FAIRED RUNNING GEAR

(71) Applicant: WETTONCRAFT, Roncq (FR)

(72) Inventor: Eric Divry, Linselles (FR)

(73) Assignee: WETTONCRAFT, Roncq (FR)

( * ) Notice: Subject to any disclaimer, the term of this patent is extended or adjusted under 35 U.S.C. 154(b) by 0 days.

(21) Appl. No.: 16/604,957

(22) PCT Filed: Apr. 11, 2018

(86) PCT No.: PCT/EP2018/059338
§ 371 (c)(1),
(2) Date: Oct. 11, 2019

(87) PCT Pub. No.: WO2018/818926
PCT Pub. Date: Oct. 18, 2018

(65) Prior Publication Data
US 2020/0122535 A1     Apr. 23, 2020

(30) Foreign Application Priority Data

Apr. 12, 2017 (FR) ...................................... 1753182

(51) Int. Cl.
*B60F 3/00* (2006.01)
(52) U.S. Cl.
CPC .................................... *B60F 3/003* (2013.01)
(58) Field of Classification Search
CPC ................................. B60F 3/003; B63C 13/00
USPC ........... 440/12.5, 12.51, 12.66, 12.67, 12.68, 440/12.69, 36
See application file for complete search history.

(56) References Cited

U.S. PATENT DOCUMENTS

| 2,890,466 | A | 8/1957 | Bly |
| 3,618,149 | A | 11/1971 | Christensen |
| 4,515,102 | A | 5/1985 | Kury |
| 7,004,801 | B2 * | 2/2006 | Bryham ................ B60F 3/0007 440/12.54 |
| 2002/0017229 | A1 | 2/2002 | Pavon et al. |
| 2006/0073745 | A1 * | 4/2006 | Ficht ........................ B63B 7/082 440/37 |

(Continued)

FOREIGN PATENT DOCUMENTS

| DE | 2204833 A1 | 8/1973 | |
| FR | 2574045 A1 * | 6/1986 | ............ B63C 13/00 |
| FR | 2773533 A1 | 7/1999 | |

(Continued)

OTHER PUBLICATIONS

International Search Report from corresponding International Application No. PCT/EP2018/059338, dated May 30, 2018, pp. 1-3, European Patent Office, Rijswijk, The Netherlands.

*Primary Examiner* — Anthony D Wiest
(74) *Attorney, Agent, or Firm* — Hauptman Ham, LLP (57) ABSTRACT

An amphibious vehicle such as a tug boat, comprising a running gear configured to be at least positioned in a deployed position suited to the rolling of the vehicle, and at least one retracted position suited to the navigation of the vehicle. The running gear comprises a fairing element rigidly connected to the running gear, so that the fairing element advantageously serves as an anti-projection device in the deployed position of the running gear. According to one option, the vehicle comprises a semi-rigid shell.

13 Claims, 5 Drawing Sheets

(56) References Cited

U.S. PATENT DOCUMENTS

2008/0047481 A1  2/2008  Maarschalkerweerd et al.

FOREIGN PATENT DOCUMENTS

| WO | 2016185039 A1 | 11/2016 |
|---|---|---|
| WO | 2017211912 A1 | 12/2017 |

\* cited by examiner

AMPHIBIOUS VEHICLE PROVIDED WITH A FAIRED RUNNING GEAR

The present application is a National Phase of International Application Number PCT/EP2018/059338, filed Apr. 11, 2018, which claims priority to French Application No. 1753182, filed Apr. 12, 2017, and both are hereby incorporated by reference in their entirety into the present application.

FIELD OF THE INVENTION

This invention relates to an amphibious vehicle. The invention concerns more particularly a light boat of the trailer boat type, intended for pleasure boaters and professionals.

TECHNOLOGICAL BACKGROUND

In the field of amphibious vehicles, a trailer boat is a boat particularly suitable for sailing. A trailer boat of this type is generally a lightweight navigable boat that integrates at least two wheels and possibly a towing system so that the boat is able to roll on land. This type of boat allows maneuvering ashore without using an independent trailer. Accordingly, this type of boat therefore simplifies the traditional logistics required for launching a standard boat and pulling it out of the water. In particular, trailer boats can be towed on a road. To maintain good navigation performance despite the addition of wheels, one solution is to design a retractable wheel system rather than have it be fixed under the hull. After launching, the wheels can be removed or disassembled by hand for example.

Another known solution is a retractable wheel system. The document U.S. Pat. No. 4,515,102 discloses such a system of wheels that can switch between a rolling position and a navigation position, said positions being simply maintained by the tension of a spring on the running gear against its stop. The wheels are thus raised to the navigation position, remaining visible and the hull of the boat, in particular the fairing, is left intact.

Other particularly complex solutions consist in retracting the wheels through the fairing of the boat. For example, document FR 2773533 A1 discloses a hull equipped with a rigid axle supporting two suspension arms bearing the wheels. The axle can pivot between a rolling position and a navigation position in which the wheels are raised and housed in recesses in the hull.

In this latter case, movable flaps attached to the hull allow openings made in the hull to be closed during a second stage, to preserve the performance of the fairing during navigation.

In the particular case of amphibious boats with semi-rigid hulls, one solution implemented by Sealegs consists in raising the running gear at the bow and stern, outside the semi-rigid hull.

The solutions envisaged are complex to implement and there is a high risk of failure.

For amphibious boats with Sealegs semi-rigid hulls, the running gear is visible in a retracted position. The silhouette of the boat is thus visually burdened by the appendages comprising of the running gear, compared to a conventional semi-rigid hull boat. The retracted running gear also significantly alters the center of gravity of the boat. Changing the center of gravity may affect the boat's trim make it less stable.

One goal of this invention is a boat comprising a running gear with simplified passage from a retracted position to a deployed position and vice versa.

In particular, one of the goals of this invention is to propose an amphibious boat with a semi-rigid hull and a visually well-integrated retracted running gear, with limited displacement of the center of gravity.

ABSTRACT OF THE INVENTION

A first aspect of the invention concerns an amphibious vehicle comprising at least one preferably semi-rigid hull having a length dimension, a width dimension and a depth dimension, and comprising at least one running gear provided with at least one wheel, said running gear being configured to be alternately positioned at least in a retracted position and in a deployed position in which the at least one wheel touches the ground.

Advantageously, the running gear comprises a fairing element integral with said running gear, where the fairing element is located below the at least one wheel depending on the depth dimension of the hull, with the running gear in the retracted position, and where the hull comprises at least two inflated tubes on a circumference of the said hull between which the running gear is positioned longitudinally, in the retracted position.

This arrangement substantially simplifies changes in the position of the running gear. Indeed, by attaching the fairing element to the running gear, the closing and opening of the hull to allow the wheels to pass is automatic and synchronized. It also limits the risk of breakdowns by reducing the number of parts required to set these two elements in motion. For example, there is no longer any need for an independent system dedicated to opening and closing the hull. Finally, use is simplified because a single control is used for the opening of the hull and the deployment of the running gear on the one hand, and the retraction of the running gear and the closing of the hull on the other hand.

The positioning of the running gear between two inflated tubes allows the direct integration of the running gear into the semi-rigid hull. The silhouette of a traditional semi-rigid hull boat is thus preserved when the running gear is retracted. Furthermore, the space requirement for the running gear in the retracted position is smaller compared to a solution consisting in lifting the running gear outside the semi-rigid hull.

Advantageously, with the running gear in the retracted position, the fairing element ensures a hydrodynamic continuity with the inflated tubes located along either side of the running gear.

This arrangement of the running gear between the inflated tubes rules out a technical belief that such an element inserted between the inflated tubes would impair the boat's navigability. On the contrary, the fairing element attached to the running gear helps to stabilize the boat and limit the impact of a bow wave, especially in deceleration or on curves.

Preferably, the running gear is positioned substantially in the center of the hull's length. Thus, by interposing the running gear in this position, the risk of moving the center of gravity towards the bow or the stern of the boat is lessened.

Advantageously, with the running gear in the extended position, this arrangement of having the fairing element fixed to the running gear allows the possibility of having a solution adapted to the need for an anti-spray device linked to the running gear. The fairing element is particularly effective in reasonably limiting material projections during rolling with the running gear deployed and advantageously completes part of the semi-rigid hull and/or fairing with the running gear in the retracted position, so that the boat maintains its navigability.

According to one possibility, the fairing element is located at least partially in front of a first portion of a tread of the wheel, and preferably in front of said tread when being towed by a forward-moving car. This advantageous positioning makes a substantial improvement to the mudguard function that the fairing element in the deployed position can provide.

The fairing element may comprise an internal surface configured to contain projections and evacuate them downwards to the ground.

Alternatively, the running gear may also comprise a second mudguard enclosing a second portion of the tread opposite the first portion, so as to optimally contain any projection of material during running.

The internal surface of the fairing element can also be configured to accommodate the running gear, at least partially.

An external surface of the fairing element can be convex.

The fairing element can therefore also form a fairing for the running gear when it is in the extended position, so that a flow of a fluid such as the air, is facilitated.

Advantageously, the faring element can have an aerodynamic effect in the deployed position and a hydrodynamic effect when retracted.

One possibility is that the hull of the boat is rigid.

Another possibility is that the hull of the boat is semi-rigid and has at least two inflated tubes on a perimeter of the said hull.

BRIEF INTRODUCTION TO FIGURES

Other characteristics, purposes and advantages of the present invention will appear when reading the following detailed description, and by reference to the attached drawings given as non-exhaustive examples and in which.

DETAILED DESCRIPTION

The invention comprises in particular the following optional features which may be used together or alternatively:

the fairing element is located at least partially in front of a first portion of a wheel tread, with the running gear in the extended position.

the fairing element comprises an internal surface configured to form at least in part a first mudguard with the running gear in the extended position.

the running gear comprises at least a second mudguard configured to surround a second portion of a wheel tread.

the fairing element is wider than the wheel.

the fairing element comprises a convex external surface.

the fairing element comprises at least one flexible flap configured to connect at least one edge of said fairing element with at least one part of the hull.

the fairing element is configured to cooperate at least longitudinally with a part of the hull to ensure continuity with said at least one part of the hull with the running gear in the retracted position.

the running gear comprises at least one suspension arm, at least one shock absorber and at least one strut configured to be able to lock the running gear in the extended position.

the strut is mobile in rotation with respect to the running gear, along an axis of rotation parallel to that of the wheel.

the strut has at least one directly or indirectly support on the hull, which can be positioned in a range of positions distributed on a circle arc on the hull.

the running gear cooperates with a cylinder or a lifting system with mechanical gearing configured to deploy and retract the said running gear.

the hull is semi-rigid and comprises at least two inflated tubes on a circumference of the said hull between which the running gear is positioned longitudinally, when in the retracted position.

the running gear includes an axis of rotation configured so that the running gear can change from the retracted position to the deployed position and vice versa.

the fairing element is articulated relatively to the hull according to an axis of rotation of the running gear.

the fairing element is attached only to the running gear.

according to one embodiment, the amphibious vehicle also comprises an arm which can be retracted at least partially into the hull with the arm in a raised position, the said arm being integral with a jockey wheel configured to provide ground support with the arm in a deployed position.

according to the previous embodiment, the arm assumed a longitudinally offset position with respect to a plane of symmetry between two running gear assemblies of the amphibious vehicle.

The present invention is particularly advantageous in the field of light craft, in that such a retractable running gear equipped with such a fairing element makes can both to stabilize the boat during navigation when the gear is retracted and substantially reduce the projections during running when the gear is deployed.

In the following description and claims, the following definitions shall apply:

Length dimension: the longest dimension of the boat's hull. Preferably this dimension runs along an axis passing through the bow and stern of the hull.

Width dimension: the dimension perpendicular to the length dimension and allowing a substantially horizontal plane to be defined.

Depth dimension: A dimension perpendicular to the horizontal plane defined by the length and width dimensions.

the front or front part of the deployed running gear refers to the forward movement direction of the boat when coupled and towed by a car for example, the forward movement corresponding to a direction along an axis running parallel to the length dimension of the hull. However, such a coupling is not necessarily useful or effective when maneuvering the boat according to the invention.

Semi-rigid: a boat whose perimeter is preferably flexible and comprises at least one inflated tube, and which is based on a rigid hull.

With reference to FIGS. 1a, 1b and 2a, 2b, a preferred embodiment is a lightweight boat 1 with a hull 2, preferably rigid or semi-rigid, comprising at least one running gear 3 and preferably two running gears 3, each equipped with at least one wheel 4 and preferably only one wheel. Advantageously, hull 2 comprises a length dimension L, a width dimension I and a depth dimension P. Advantageously, the length dimension L and the width dimension I define a horizontal preference plane. Advantageously, a user moves within the boat along the said horizontal plane. Each running gear 3 is retractable and can be positioned at least in a deployed position 200 and in a retracted position 100. Running gears 3 are preferably located on the two opposite sides of boat 1.

According to one possibility, each running gear 3 can be independent of the other.

Alternatively, the running gears have a coordinated or synchronized movement for changing from the deployed position 200 to the retracted position 100, and vice versa. For example, an axle can connect the running gears 3.

Running gear 3 preferably includes a rotation axis 300 with respect to hull 2, configured to deploy or retract said running gear 3.

Figure 1A:
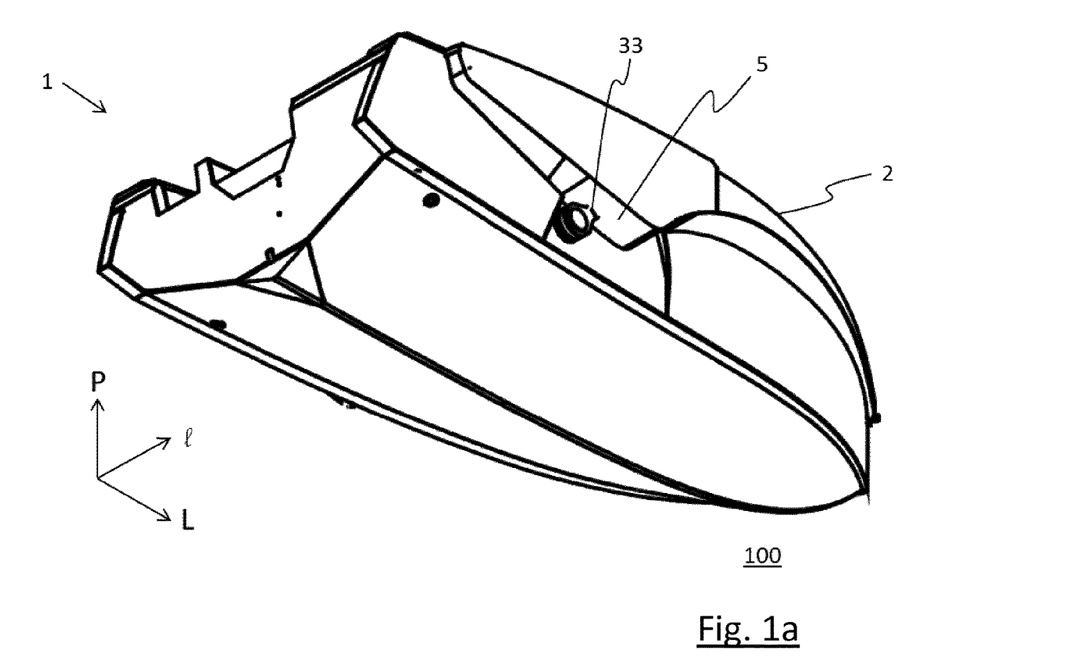
FIGS. 1a and 1b show respectively a three-quarter rear view and a profile view of a rigid hull boat according to an embodiment of the invention with the running gear in a retracted position.
Figure 1B:
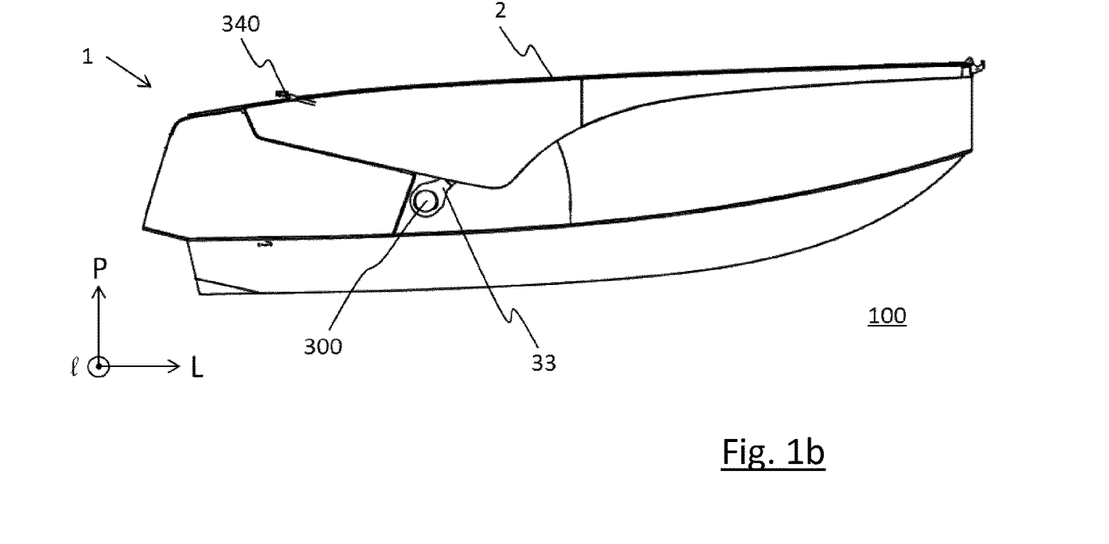

In the retracted position 100, running gear 3 is preferably housed in a housing provided in hull 2, so that boat 1 can navigate unobstructed.

Figure 2A:
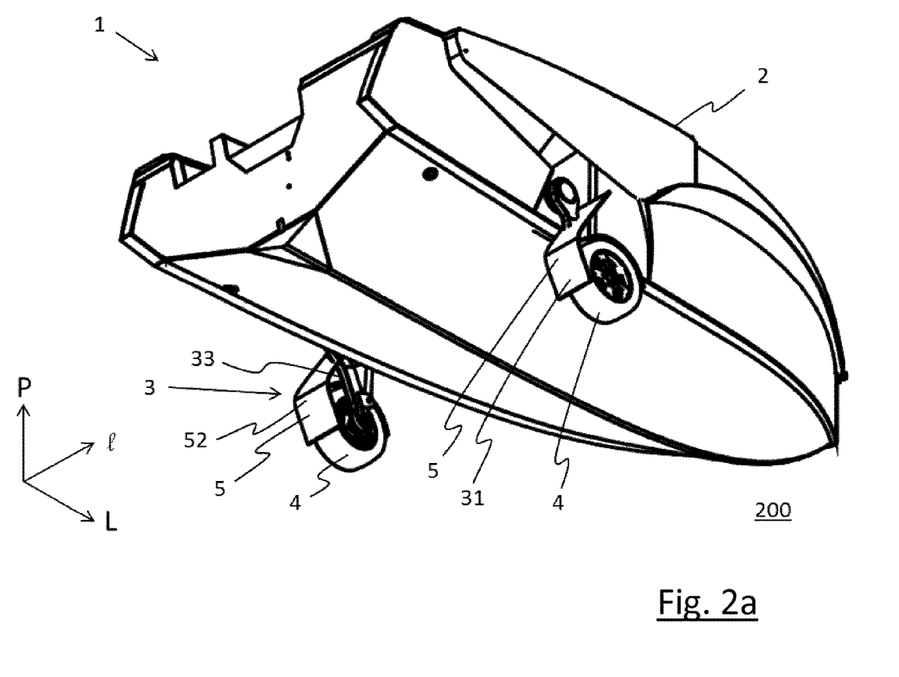
FIGS. 2a and 2b show respectively a three-quarter rear view and a profile view of a rigid hull boat according to an embodiment of the invention with the running gear in a deployed position
Figure 2B:
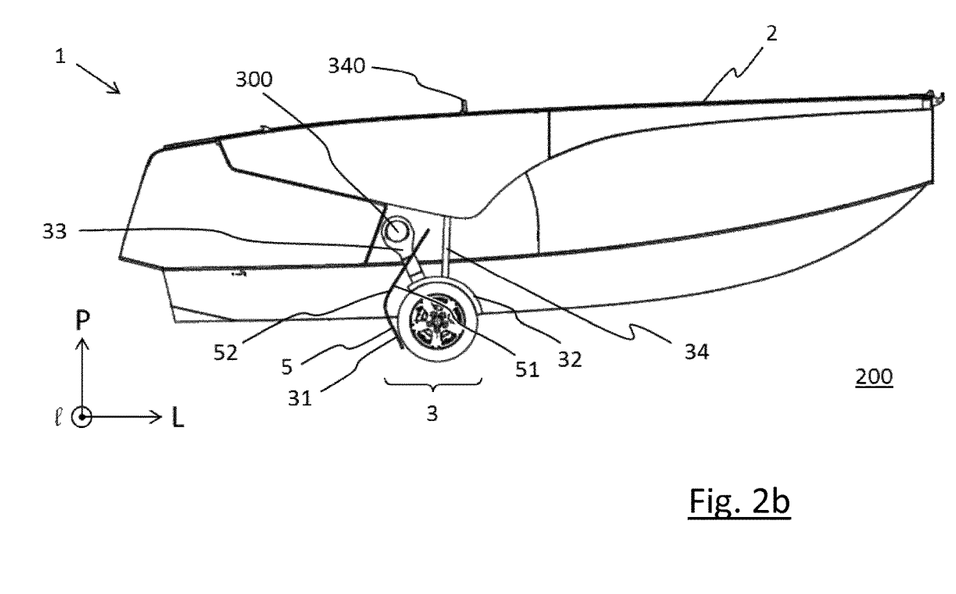

In the extended position 200, the running gear 3 ensures a ground connection of wheel 4. Boat 1 can thus be maneuvered on the ground without the need for a trailer, for example.

Boat 1 preferably includes a drawbar or hitch system so that it is possible to hitch and tow the boat 1 behind a car, for example. In this case, especially if boat 1 is towed on a road, it is advantageous for running gear 3 to be equipped with anti-spray devices. Such anti-spray devices, otherwise called mudguards, limit the projection of liquid and/or solid elements when the wheels are running 4.

The running gear 3 of boat 1 advantageously comprises a fairing element 5 dedicated to the said running gear 3, so that this element 5 acts at least partly as an anti-spray device when in the deployed position 200. The fairing element 5 is advantageously integral with the running gear 3 and preferably attached to it. "Integral with the running gear" means that there is a physical link between the said running gear 3 and the fairing element 5. The said physical link allows the fact that any movement of the running gear 3 results de facto in a similar movement, and preferably the same movement, of the running gear 3.

In particular, the fairing element 5 is located in front of a portion of the tread of the wheel 4, and preferably in front of the said tread when the boat 1 is being towed by a forward-moving car. In front of the tread means positioning with respect to the forward movement of the car towing the boat 1 for example.

The fairing element 5 has an internal surface area 51. This internal surface 51 is preferably configured to limit projections during driving. This surface 51 may have grooves or patterns configured to contain the projection of water or mud and evacuate it by its flow towards the ground for example. The grooves on the internal surface 51 can advantageously direct this flow towards the ground. The fairing element 5 can therefore form a first mudguard 31.

The running gear 3 of boat 1 can also comprise a second mudguard 32 configured to surround a second portion of the tread of a wheel 4. This second mudguard 32 is preferably located opposite the first mudguard 31 in order to contain the material projection during rolling.

The running gear 3 of the boat 1 also includes at least one suspension arm 33, preferably a suspension leaf integrated in the arm 33 or a shock absorber, and a strut 34 designed at least to lock the running gear 3 in the deployed position 200. A braking system can possibly complete the running gear 3.

The fairing element 5 can advantageously partially hide at least part of one of the elements of the suspension arm 33, the shock absorber, the strut 34 and the braking system for example. The internal surface 51 may have a complementary shape to said at least one element so that the element can be partially housed in it.

The fairing element 5 can then advantageously form a fairing for running gear 3. An external surface 52 of the fairing element 5 can be configured to optimize a flow of a fluid such as that made around running gear 3 during rolling and/or of a liquid during navigation. The external surface 52 can be at least partially convex, for example.

The width of the fairing element 5 shall be at least equal to or greater than the width of the tread of wheel 4. The width of the fairing element of hull 5 can be included between 15 cm and 50 cm for example. A length of fairing element 5 can be between 40 cm and 90 cm for example, so that a major part of the front of the running gear 3 is surrounded, at least in the deployed position 200.

In the deployed position 200, the strut 34 advantageously reinforces the running gear 3 during running, by supporting part of a force or a load.

The strut 34 can be a metal rod, preferably movable in rotation with respect to the suspension arm 33, along an axis parallel to the axes of rotation of the running gear 3 and wheel 4. This configuration makes it possible to improve the handling of the strut 34, and to fold it back into the retracted position 100 in order to reduce advantageously the space required for running gear 3 with its strut 34.

The strut 34 is configured to bear directly or indirectly on a suspension leaf on the hull 2. This support can be a protruding part of the strut 34 for example. This protruding part can be guided by a slide on hull 2 between a first stop relative to the retracted position 100 and a second stop relative to the deployed position 200 for example.

The strut 34 may in particular have an elbow that forms a handle 340 at one end of the strut 34. The said handle 340 can pass through part of the hull 2 through an opening so that a user can work it. The opening can be, for example, a groove allowing at least a rectilinear movement of the handle 340 to operate the running gear 3 via the strut 34. The actuation includes in particular a switchover between the retracted position 100 and deployed position 200 of running gear 3. Actuation may also include a locking action in each of the said positions 100, 200. An electric cylinder or a lifting system with mechanical reduction can assist the actuation. In particular, the electric cylinder makes it advantageously possible to deploy and/or retract the running gear 3.

Optionally, the running gear 3 may include an automatic braking system in the event of a hitch failure, for example, or a brake assistance system, possibly controlled by an inertia braking system.

The fairing element 5 is preferably rigid. The fairing element 5 can also include flexible parts.

According to one possibility, the fairing element 5 includes at least one flexible flap 53 on at least one side of said element. This flap 53 is preferably configured to connect the at least one side of the fairing element 5 with at least one part of the hull 2. The flap 53 can thus act as a junction between two adjacent parts of the fairing element 5 and hull 2 respectively. The flap 53 can be made of rubber for example, and/or include a material with a flexibility comparable to that of rubber in particular.

A first part of hull 2 in front of running gear 3 can for example be connected to a first end of the fairing element 5 by a first flap. This first flap can thus act as an articulation in the deployed position 200.

A second end of the fairing element 5 can also be equipped with a second flexible or rigid flap for example. This second end, on a side opposite the first end, is located near the ground in the deployed position 200. The second flap thus advantageously extends the spray-suppression device.

In the retracted position 100, the second flap joins a second part of hull 2, so that continuity is advantageously established between the fairing element 5 and the said second part of hull 2.

Continuity between the fairing element 5 and said the second part of hull 2 in retracted position 100 is referred to in opposition to discontinuity in the horizontal plane generated by the presence of the running gear 3 in the deployed position 200.

This may be strict continuity with surfaces following each other without significant gaps or offsets in space. This continuity can be almost continuous in that slight intervals or offsets are possible without affecting the flowing of water along the hull; for example, intervals or offsets of less than 10 cm or even 5 cm are allowed.

Optionally, a flexible flap acting as a seal can be extended on all the dimensions of the fairing element 5 so as to join all the edges of the housing formed in the hull 2 in the retracted position 100.

Preferably, the fairing element 5 has at least a continuity with at least part of the hull 2 in the retracted position 100. The fairing element 5 can advantageously embody longitudinal continuity with the hull 2, to optimize the flowing of water when in the retracted position 100, especially during navigation. The external surface 52 of the fairing element 5 can have at least one shape specific to navigation, such as a rib serving as a fin or a keel-board for example.

In the retracted position 100, the running gear 3 is located above the fairing element 5. The running gear 3 is at least partially located in hull 2, preferably above a waterline of the boat 1, in the said retracted position 100.

With reference to FIGS. 3*a*, 3*b* and 4*a*, 4*b* a second embodiment of the invention is a semi-rigid 2 hull boat 1 with at least two inflated tubes 20, 21 on a perimeter of the said hull 2.

Only the characteristics distinct from the first embodiment are described below, the other characteristics not described being considered identical to those of the first embodiment. In particular, the fairing element 5 associated with the running gear 3 making it possible on the one hand to limit projections in the deployed position 200 of the running gear 3, and on the other hand to contribute to navigation in the retracted position 100 of the running gear 3 is a principle common to both embodiments. The differences concern in particular the complementarity characteristics of the shape between the said fairing element 5 and the semi-rigid hull 2 of boat 1.

Figure 3A:
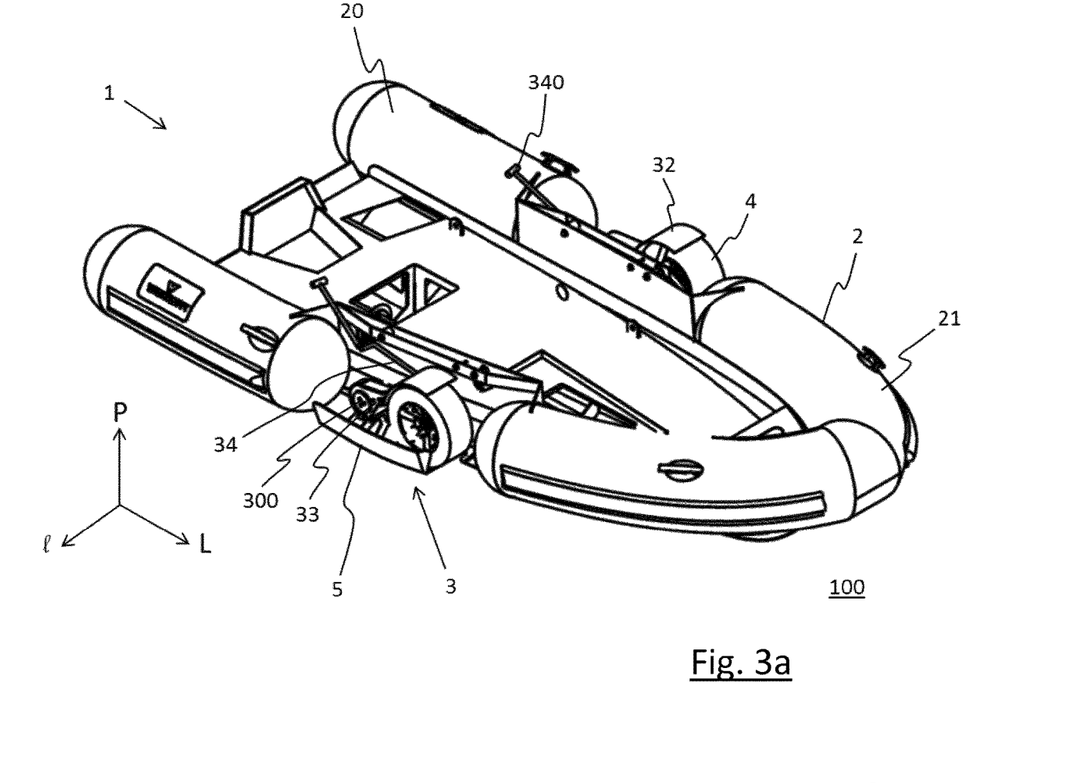
FIGS. 3a and 3b show respectively a three-quarters front view and a profile view of a semi-rigid hull boat according to an embodiment of the invention with the running gear in a retracted position.
Figure 3B:
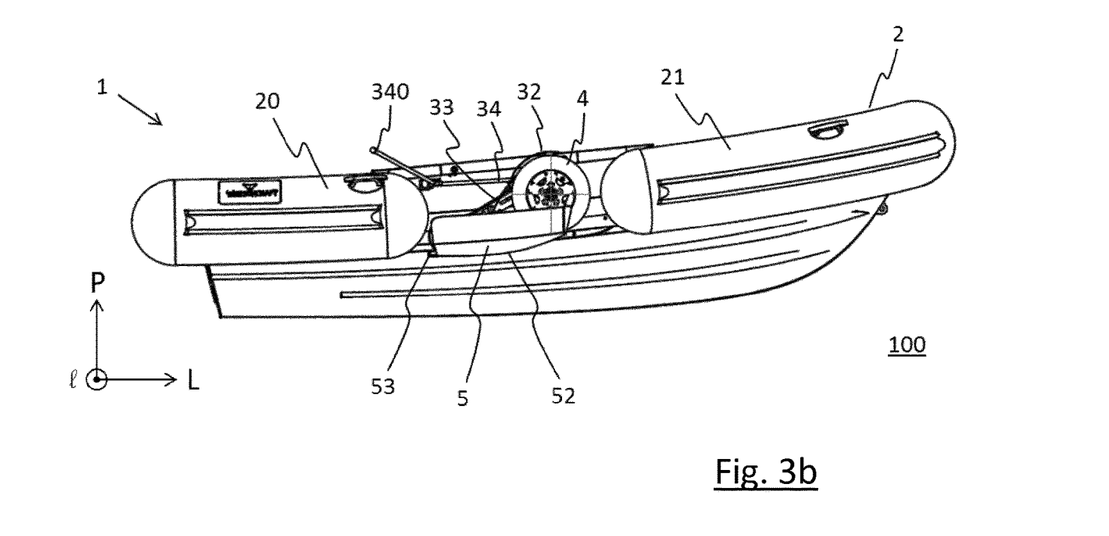
Figure 4A:
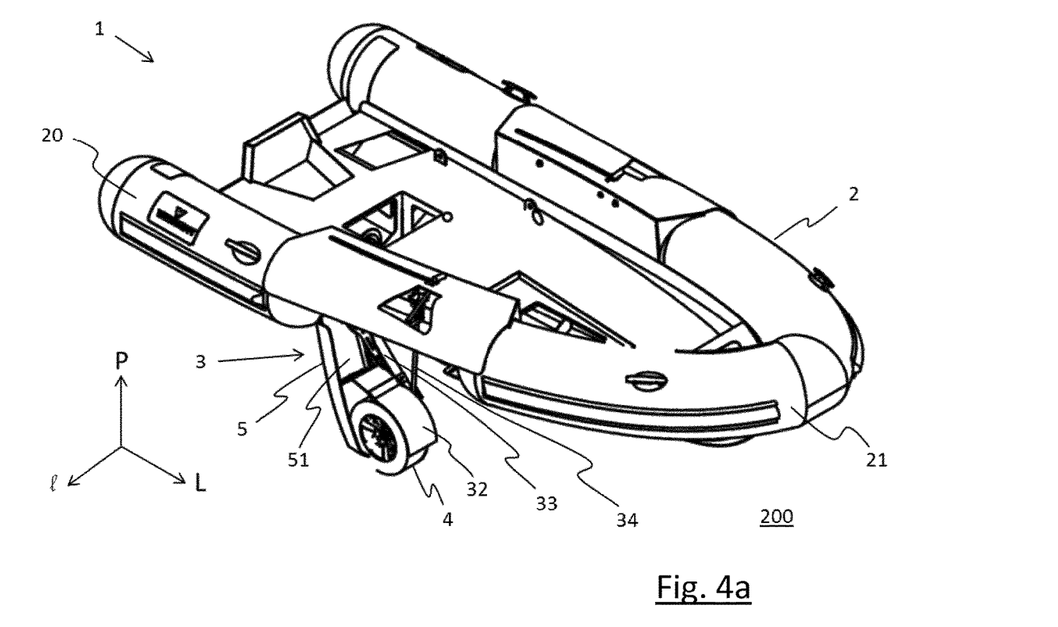
FIGS. 4a and 4b show respectively a three-quarter rear view and a profile view of a rigid hull boat according to an embodiment of the invention with the running gear in a deployed position.
Figure 4B:
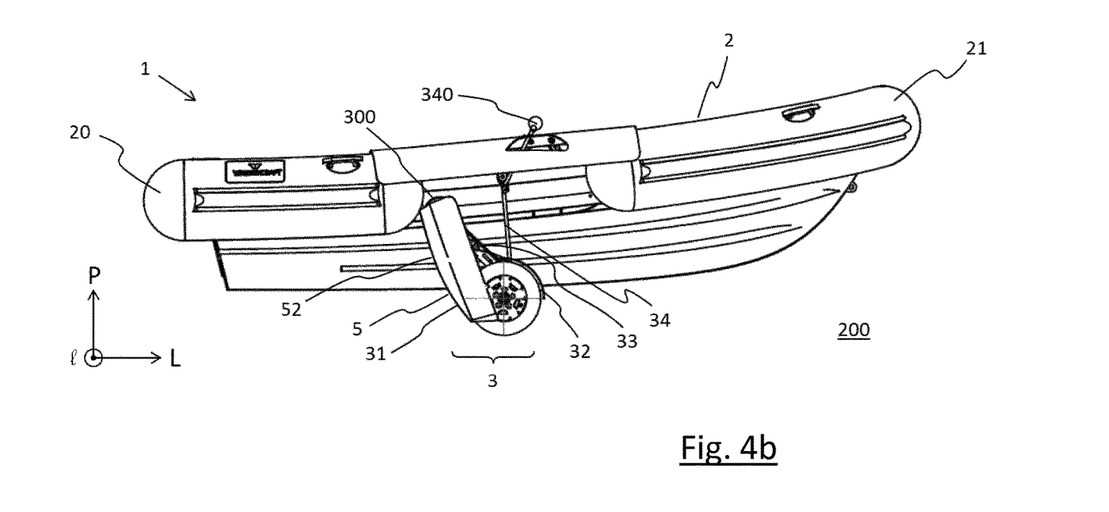

In particular, the running gear 3 is configured to be deployed and retracted in a section without inflated tube between the two inflated tubes 20, 21 around the perimeter of hull 2. In particular, the running gear 3 is positioned longitudinally between said inflated tubes 20, 21 in the retracted position 100, in the continuity of them.

The fairing element 5 attached to the running gear 3 then runs along the longitudinal axis of the inflated tubes 20, 21. In the retracted position 100, the fairing element 5 is configured to cooperate with adjacent inflated tube, particularly in a lower part of the said inflated tubes 20, 21. The fairing element 5 may have, for instance, one at least partially semi-cylindrical shape aligned with the lower part of the inflated tubes 20, 21.

Figure 5A:
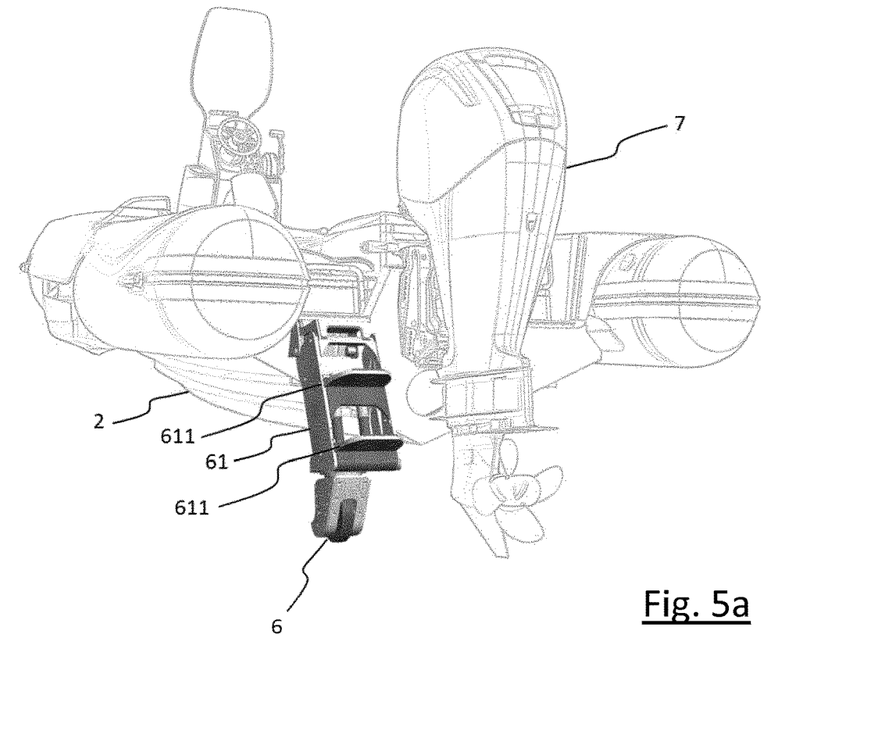
FIGS. 5a and 5b show a jockey wheel in a deployed position and a retracted position respectively, according to the embodiment of the invention.
Figure 5B:
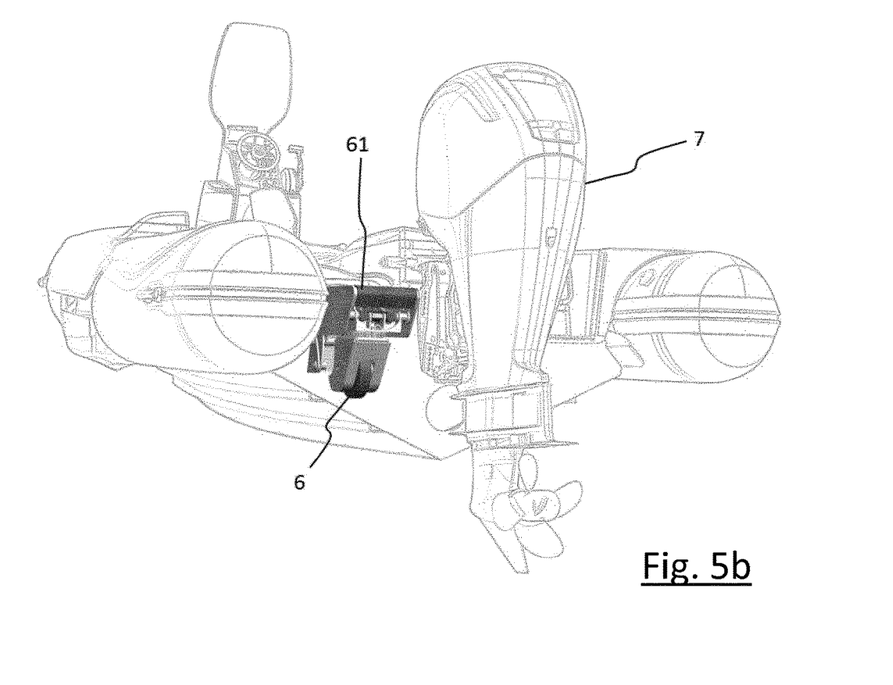

With reference to FIGS. 5*a* and 5*b*, boat 1 includes, in another embodiment, a jockey wheel 6 at the stern of boat 1. This jockey wheel 6 is configured to be retractable.

The running gear of boat 1 may then comprise running gear 3 and jockey wheel 6.

The jockey wheel 6 provides a third ground support point with the running gear in a deployed position, in addition to the supports provided by the two running gears 3.

The jockey wheel 6 is preferably supported by an arm 61.

It is preferably free to rotate freely with respect to the arm 61, so that it can be used for maneuvering the boat 1 in different directions on the ground.

The arm 61 supporting the jockey wheel 6 is configured to be raised, for example manually, to be moved from a deployed position to a raised or retracted position.

The arm 61 is preferably at least partially retractable into the hull 2 and/or the fairing.

The jockey wheel 6 can be mounted fixed or articulated at the end of arm 61. An articulation such as this between the jockey wheel 6 and the arm 61 can optimize the space requirement of the arm 61 and wheel 6 assembly in the raised position (FIG. 5*b*).

In an advantageous way, the arm 61 supporting the jockey wheel 6 can be offset from the longitudinal central axis of the boat 1, so that another element, such as a towing element and a drawbar in particular, can be installed along this central axis.

The jockey wheel 6 can thus be deployed in conjunction with the towing drawbar.

The jockey wheel 6 can also be deployed without the need to raise the motor 7.

The arm 61 can advantageously include at least one step 611 to facilitate access on board boat 1 for a user.

In one embodiment of the invention not shown in the figures, the arm 61 is in the form of a retractable ladder comprising at least one rung and the jockey wheel.

The invention is not limited to the embodiments previously described but extends to all the embodiments falling within the scope of the claims.

REFERENCES

1. Amphibious vehicle
2. Hull
    20,21 Inflated tubes
3. Running gear
    300. Axis of rotation
    31. First mudguard
    32. Second mudguard
    33. Suspension arm
    34. Strut
        340 Handle
4. Wheel
5. Fairing element
    51. Internal surface area
    52. External surface area
    53. Flap
6. Jockey wheel
    61. Arm
        611. Step
7. Motor
    100. retracted position
    200. Deployed position
L. Length dimension
I. Width dimension
P. Depth dimension

The invention claimed is:

1. An amphibious vehicle comprising at least one preferably semi-rigid hull having a length dimension, a width dimension and a depth dimension, and comprising at least one running gear provided with at least one wheel, said running gear being configured to be alternately positioned at least in a retracted position and in a deployed position in which the at least one wheel touches the ground, the running gear comprising a fairing element integral with the said running gear, the fairing element being located below the at least one wheel according to the depth dimension of the hull, in the retracted position of the running gear, the hull comprising at least two inflated tubes on a periphery of said hull, the running gear being, in the retracted position, longitudinally positioned between the at least two inflated tubes in continuity of the said at least two inflated tubes and in a section without inflated tubes, so that the fairing element ensures hydrodynamic continuity with said at least two inflated tubes in the retracted position.

2. The amphibious vehicle according to claim 1, in which the fairing element is located at least partially in front of a first portion of a tire tread of the wheel, with the running gear in the deployed position.

3. The amphibious vehicle according to claim 1 wherein the fairing element comprises an internal surface configured to form at least in part a first mudguard in the deployed position of the running gear.

4. The amphibious vehicle according to claim 3 in which the running gear comprises at least a second mudguard configured to surround a second portion of a wheel tread.

5. The amphibious vehicle according to claim 1 wherein the fairing element has a greater width than a width of the wheel.

6. The amphibious vehicle according to claim 1 wherein the fairing element comprises a convex outer surface.

7. The amphibious vehicle according to claim 1, wherein the fairing element comprises at least one flexible flap configured to connect at least one side of said fairing element with at least one part of the hull.

8. The amphibious vehicle according to claim 1, wherein the fairing element is configured to cooperate at least longitudinally with a part of the hull to ensure continuity with said at least one part of the hull with the running gear in the retracted position.

9. The amphibious vehicle according to claim 1, wherein the running gear comprises at least one suspension arm and at least one strut configured to be able to lock the running gear in the deployed position.

10. The amphibious vehicle according to claim 9, wherein the strut is mobile in rotation with respect to the running gear, along an axis of rotation parallel to the axis of rotation of the wheel.

11. The amphibious vehicle according to claim 9, wherein the strut has at least one support on the hull, which can be positioned in a range of positions distributed on a circle arc on the hull.

12. The amphibious vehicle according to claim 1 wherein the running gear includes a rotation axis configured so that the running gear passes from the retracted position to the deployed position and from the deployed position to the retracted position.

13. The amphibious vehicle according to claim 12 wherein the fairing element is articulated relative to the hull according to an axis of rotation of the running gear.

* * * * *